`US007641284B2`

(12) United States Patent
Jones et al.

(10) Patent No.: US 7,641,284 B2
(45) Date of Patent: Jan. 5, 2010

(54) SLIDEABLE ARMREST

(75) Inventors: Stephen Jones, Commerce, MI (US); Jeremy Lee, Washington, MI (US)

(73) Assignee: Faurecia Interior Systems U.S.A. Inc., Auburn Hills, MI (US)

( * ) Notice: Subject to any disclaimer, the term of this patent is extended or adjusted under 35 U.S.C. 154(b) by 85 days.

(21) Appl. No.: 11/096,374

(22) Filed: Apr. 1, 2005

(65) Prior Publication Data
US 2005/0225148 A1 Oct. 13, 2005

Related U.S. Application Data

(60) Provisional application No. 60/561,178, filed on Apr. 9, 2004.

(51) Int. Cl.
*A47C 7/54* (2006.01)
(52) U.S. Cl. ............... 297/411.2; 297/115; 297/411.35
(58) Field of Classification Search ................ 297/115, 297/411.2, 411.21, 411.32, 411.35; 312/324; 296/37.8
See application file for complete search history.

(56) References Cited

U.S. PATENT DOCUMENTS

| | | | | |
|---|---|---|---|---|
| 5,439,268 | A | * | 8/1995 | Dozsa-Farkas ......... 297/411.35 |
| 5,927,811 | A | * | 7/1999 | Tseng ....................... 297/353 |
| 6,045,173 | A | * | 4/2000 | Tiesler et al. ............. 296/37.8 |
| 6,074,012 | A | | 6/2000 | Wu |
| 6,244,648 | B1 | * | 6/2001 | Gackstatter ............... 296/37.8 |
| 6,419,314 | B1 | | 7/2002 | Scheerhorn |
| 6,719,344 | B2 | | 4/2004 | Ono et al. |
| 6,719,367 | B2 | * | 4/2004 | Mic et al. ............... 297/188.19 |
| 6,957,866 | B1 | * | 10/2005 | Cai ........................ 297/411.35 |
| 7,029,049 | B2 | * | 4/2006 | Rockafellow et al. ...... 296/37.8 |
| 7,077,468 | B2 | * | 7/2006 | Maierholzner ......... 297/188.19 |
| 2003/0107228 | A1 | | 6/2003 | Ono et al. |

FOREIGN PATENT DOCUMENTS

| | | |
|---|---|---|
| JP | 08113086 | 5/1996 |
| JP | 8113086 | 5/1996 |
| JP | 2003175772 | 6/2003 |
| KR | 1995-13159 | 6/1995 |
| KR | 1999-48081 | 7/1999 |

OTHER PUBLICATIONS

Notification of transmittal of International Search Report and Written Opinion of International Application PCT/US2005/11182.
Korean Office Action for corresponding Korean application No. 10-20067020918 dated: Jun. 5, 2008.
Office Action for corresponding Korean application No. 10-20067020918 dated: Sep. 20, 2007.
Office Action for corresponding Japanese application No. 2007506330 dated: Aug. 11, 2009.
Office Action for corresponding Chinese application No. 200580012259.7 dated: Jul. 24, 2009.
Trial Decision for corresponding Korean application No. 10-20067020918 dated: Apr. 20, 2009 (with English Summary).

* cited by examiner

*Primary Examiner*—Laurie K Cranmer
(74) *Attorney, Agent, or Firm*—Matthew B. Dernier, Esq.; Gibson & Dernuer LLP

(57) ABSTRACT

A slideable armrest, which may form a lid of a vehicle console compartment, comprises a cover and a base slideably connected to each other by slideable engagement between at least one guide and at least one guide groove.

14 Claims, 2 Drawing Sheets

SLIDEABLE ARMREST

CROSS-REFERENCE TO RELATED APPLICATION

This application claims the benefit of U.S. Provisional Application No. 60/561,178 filed on Apr. 9, 2004, the entire disclosure of which is incorporated herewith by reference.

BACKGROUND OF THE INVENTION

The present invention relates to an armrest, and more particularly, to an armrest that forms a part of a console compartment in a vehicle, such as in an automobile between bucket seats.

Vehicle interior components are increasingly including convenience items for vehicle operators and passengers. Center consoles located between seats are a typical accessory that may include a storage compartment with its lid being also used as an armrest. As the seats may be adjusted in a forward-to-rearward direction, it is desirable for the armrest to provide similar adjustment.

An example of a slideable armrest is illustrated and discussed in U.S. Pat. No. 6,419,314, the entire disclosure of which is hereby incorporated by reference. In the '314 patent, a cover assembly of a console compartment is also used as an armrest. The cover assembly includes a cover for an arm to rest thereon and a base for openable covering the compartment. The cover and the base are connected together by a U-shaped slide assembly so that the cover can slide relative to the base by the guiding rods provided in the slide assembly. However, the cover assembly in '314 patent comprises many components and is complicated in structure, implying a high cost in both manufacturing and assembling.

Therefore, there is a need for an improved slideable armrest that is simple in structure and therefore is of low cost in both design and manufacturing, and easy to assemble as well.

SUMMARY OF THE INVENTION

A slideable armrest is provided in accordance with present invention, which comprises a cover and a base slideably engaged with each other by way of at least one guide and at least one guide groove. The at least one guide is provided on one of the cover and the base, while the at least guide groove is provided on the other of the cover and the base. With the adoption of the guide-groove arrangement, the structure of the armrest is significantly simplified.

Preferably, a biasing means is provided for biasing the cover and the base in a direction urging them apart, so as to prevent rattling and to provide a desirable feel while sliding the cover on the base. Preferably, the biasing means comprises a leaf spring placed between the cover and the base.

Preferably, a detent mechanism is provided to delineate various desired relative positions of the cover and the base. Preferably, the detent mechanism comprises multiple recesses and at least one projection engageable with the multiple recesses, or multiple projections and at least one recess engageable with the multiple projections.

Preferably, a stop mechanism is provided to prevent the cover from further sliding when a maximum position is reached. Preferably, the stop mechanism comprises a vertical wall provided on the cover that is operable to abut an end of the base when the maximum position is reached. Preferably, one or more ribs are provided on an inner surface of the vertical wall to abut the end of the base.

In a preferred embodiment, the armrest forms a lid of a vehicle console compartment.

BRIEF EXPLANATION OF THE DRAWINGS

The above and other features and advantages will be clearer after reading the detailed description of the preferred embodiments of the present invention with reference to the accompanying drawings, in which.

DETAILED DESCRIPTION OF THE PREFERRED EMBODIMENTS

Figure 1:
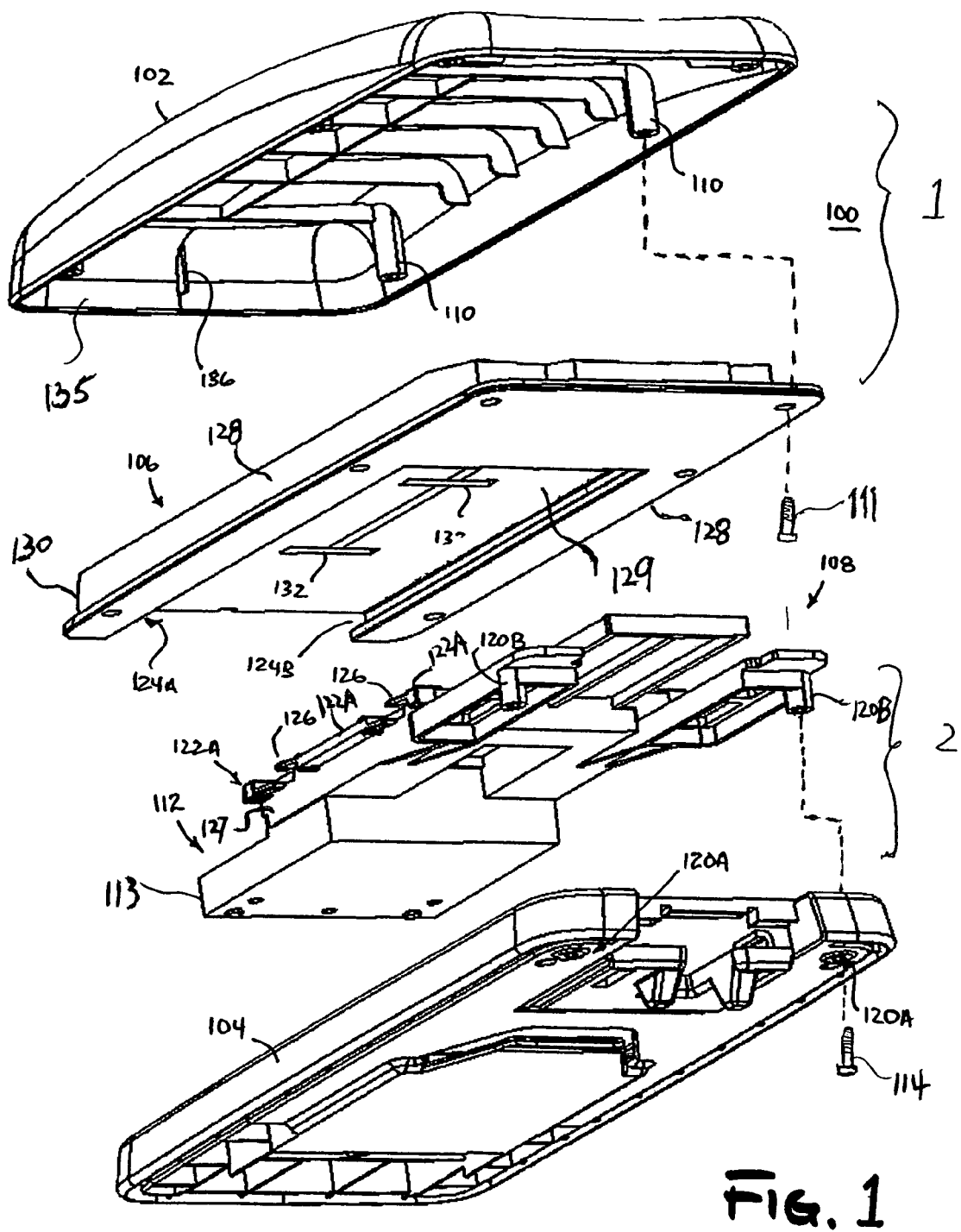
FIG. 1 is an upper perspective exploded view of a preferred embodiment of the slideable armrest according to the present invention.
Figure 2:
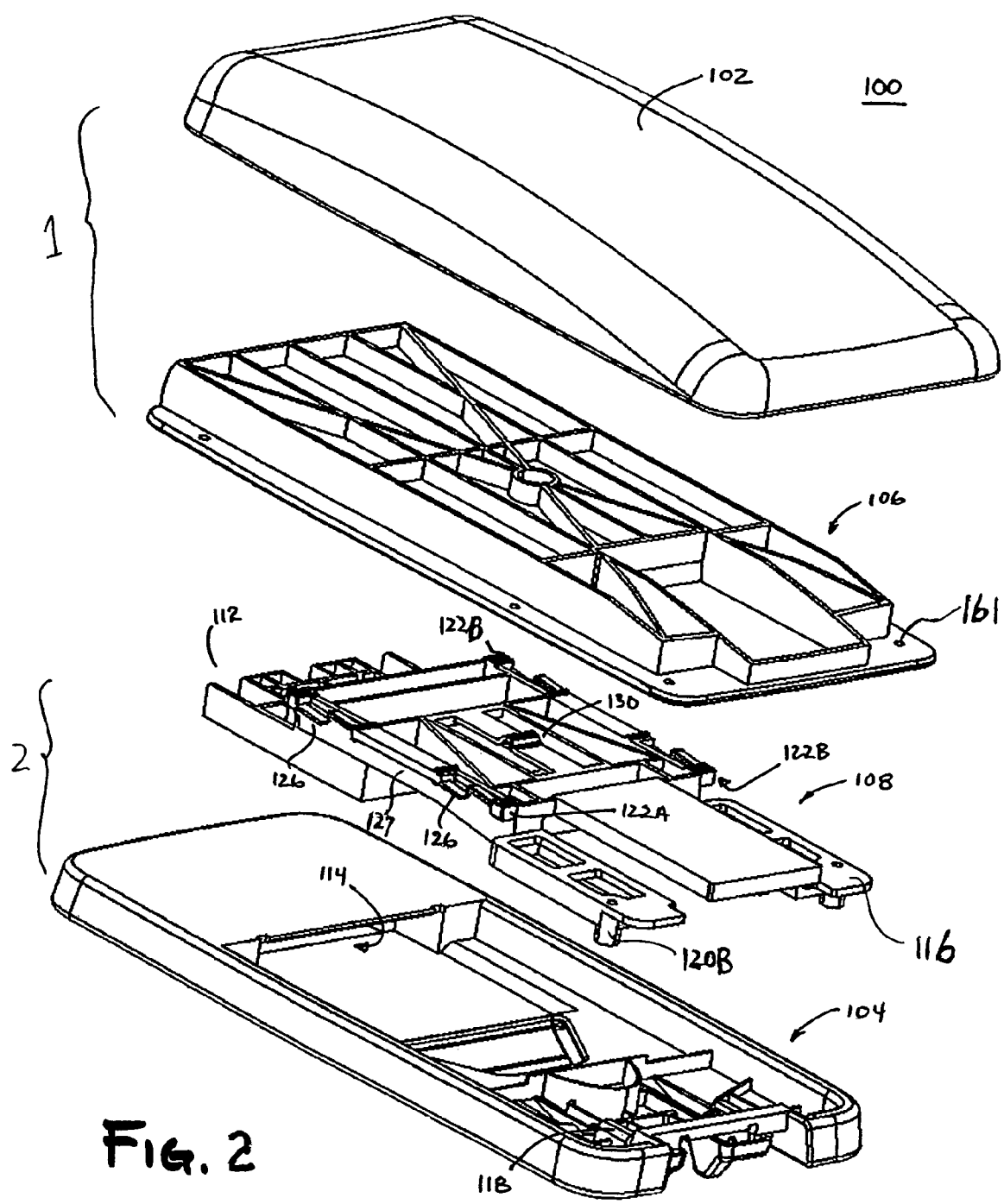
FIG. 2 is a lower perspective exploded view of the embodiment shown in FIG. 1.

With reference to FIGS. 1 and 2, an embodiment of a slideable armrest assembly 100 in accordance with the present invention is illustrated, which generally includes a cover assembly 1 and a base assembly 2. The cover assembly 1 comprises a cover 102 and a first slider component 106, and the base assembly 2 comprises a base 104 and a second slider component 108. The cover 102 has an upper surface suitable for an arm to rest thereon, and may be padded with a suitable soft upholstery material. Preferably, the first and second slider components 106, 108 are formed entirely of plastic.

In a preferred embodiment, the armrest assembly 100 forms a lid of a vehicle console storage compartment (not shown), such as one between bucket seats. One end of the base assembly 2 may be pivotally connected to the storage compartment by means of a hinge so as to be movable between an open position for gaining access to the interior of the compartment and a closed position for covering the compartment.

The first slider component 106 may be connected to the undersurface of the cover 102 by means of fasteners, such as screws 111 (one is illustrated in FIG. 1 for exemplary purposes). More specifically, a plurality of holes 161 are provided on the first slider component 106 around the periphery of the component 106, each hole 161 corresponding to one of a plurality of standoffs 110 depending from the cover 102. By passing the screws 111 through the holes 161 for engagement with the standoffs 110, the first slider component 106 can be firmly secured to the cover 102.

Though the screws 111 are used as an example, it is understood that any other suitable fasteners, such as rivets, nails, etc., can also be used instead of the screws 111. Alternatively, other connection methods are also applicable. For example, the first slider component 106 can be connected to the cover 102 by a snap-fitting connection, by an adhesive, fusion, etc.

The second slider component 108 is also preferably firmly secured to the base 104 by way of appropriate fastening means, such as those used for connecting the first slider component 106 to the cover 102 as explained above. Alternatively, as shown in FIGS. 1 and 2, the second slider component 108 may include a stepped-down forward portion 112 that is receivable into a recess 114 formed on the base 104 in order to maintain a connection between the second slider component 108 and the base 104. A rearward portion 116 of the second slider component 108 may be coupled to the base 104 by means of fasteners (e.g., screws 114, one of which is shown in FIG. 1) that pass through the apertures 120A on the base 104 and engage the standoffs 120B on the second slider component 108.

Though specific exemplary fastening elements are illustrated in this embodiment, it is understood that any of the known or hereafter developed fastening techniques may be employed to firmly secure the first slider component 106 to the cover 102, and the second slider component 108 to the base 104.

Preferably, according to one or more embodiments of the present invention, the first slider component 106 and the second slider component 108 are slideably connected to each other by a slideable guide-groove arrangement. More specifically, as illustrated in the figures, the second slider component 108 is provided with a plurality of guides 122A, 122B that are disposed along opposite longitudinal sides 127 (only one side 127 being shown) and extend laterally from the sides 127. Adjacent to a surface 129 of the first slider component 106 complimentary guide grooves 124A, 124B are provided that extend longitudinally along and face inwardly from opposite sides 128. The guides 122A, 122B and the guide grooves 124A, 124B are preferably sized and shaped such that the guides 122A, 122B may be slideably received within the grooves 124A, 124B to facilitate a forward-to-rearward sliding movement between the first and second slider components 106, 108, and therefore between the cover assembly 1 and the base assembly 2. The grooves 124A, 124B are preferably open at an end 130 such that the guides 122A, 122B may be received into the grooves 124A, 124B. By confining guides 122A, 122B in the grooves 124A, 124B, the cover assembly 1 and the base assembly 2 are connected together and prevented from moving vertically relative to one another.

It is noted that alternative guide-groove arrangements are contemplated as being with the scope of the invention. For example, the guides 122A, 122B may be provided on the first slider component 106, while the guide grooves 124A, 124B are provided on the second slider component 108. Alternatively, both the first slider component 106 and the second slider component 108 may be provided with guides and guide grooves such that the guides on the first slider component 106 are slideably engageable with the guide grooves on the second slider component 108 and the guide grooves on the first slider component 106 are engageable with the guides on the second slider component 108.

Preferably, a biasing means is provided for urging the cover assembly 1 and the base assembly 2 away from each other so that rattling is avoided and some sliding resistance is exhibited. This provides a desirable feel to the user. For example, the biasing means may include one or more biasing springs that are preferably disposed along and/or proximate to the guides 122A, 122B in order to provide a biasing force as between the first and second slider components 106, 108. Preferably, a plurality of leaf springs 126 may be connected to some or all of the guides 126 such that they tilt from the guides 126 towards and engage the surface 129. The leaf springs 126 are preferably sized and shaped to slideably engage the surface 129 to achieve the desired urging and resistive forces discussed above.

Preferably, a detent mechanism is provided to delineate various desirable sliding positions of the armrest assembly 100. As illustrated in the figures, a projection 130 is provided at the center of the upper surface of the second slider component 108 that protrudes upward so as to engage with one of a plurality of recesses 132 formed on the surface 129 of the first slider component 106 when a desired sliding position is reached. Preferably, the projection 130 and the recesses 132 have some lateral extension to increase engagement forces. Preferably, the projection 130 is made of a resilient material such that the projection 130 may deform to disengage itself from the recess 132 when a sufficient force is applied thereon in a forward or backward direction, thereby allowing the cover assembly 1 to slide on the base assembly 2.

The properties of the projection 130 are preferably such that friction between the projection 130 and the surface 129 aids in the aforementioned feel to the user. Preferably, the projection 130 and the recesses 132 are also sized and shaped such that a desirable feel (i.e., a feel of a positive snap-fit) is provided when a desired sliding position is achieved.

It is noted that the arrangement of the projection 130 and the recesses 132 illustrated in the figures are provided by way of example only. The projection 130 and the recesses 132 can be of other suitable configurations without departing from the scope of the invention. For example, an alternative projection may be a ball disposed in a socket and biased outward by a spring toward a plurality of semispherical recesses. In addition, more than one projection 130 may be provided to engage with the plurality of recesses 132. Alternatively, the various desirable positions may be delineated by engagement of one or more recesses 132 with a plurality of projections 130. Furthermore, in an alternative configuration the projection or projections 130 may be provided on the first slider component 106, while the recess or recesses 132 are provided on the second slider component 108.

Preferably, a stop means is provided to prevent further sliding movement of the cover assembly 1 relative to the base assembly 2 when a maximum position is reached. For example, as shown in the figures, the cover 102 has a front vertical wall 135, and one or more ribs 136 are provided on an inner surface of the front wall 135. When the cover assembly 1 slides backward and reaches the maximum position, the ribs 136 abut a front end 113 of the second slider component 104, thereby preventing the cover assembly 1 from sliding further. In an alternative embodiment, one or more bumpers (not shown) may be employed on the cover 102 in addition to or instead of the ribs 136. It is believed that the bumper is more repeatable in production leading to better results.

Though the above has described the preferred embodiments of the present invention, it shall be understood that numerous adaptations, modifications and variations are possible to those skilled in the art without departing the gist of the present invention. Therefore, the scope of the present invention is solely intended to be defined by the accompanying claims.

The invention claimed is:

1. An armrest, comprising:
   a cover having one of: at least one guide, and at least first and second guide grooves;
   a base having the other of the at least one guide and the guide grooves, wherein:
   the at least one guide and the guide grooves extend longitudinally in a sliding direction,
   the first and second guide grooves are disposed laterally opposite to one another and each includes at least one recess, the respective recesses face one another in a lateral direction, transverse to the sliding direction,
   the at least one guide extends laterally into at least one of the recesses, and
   the cover and the base are slideably engaged with one another by the at least one guide and the guide grooves in the sliding direction; and
   at least one leaf spring integrally depending from the at least one guide and laterally extending into the one of the recesses such that the at least one leaf spring is biased: (i) transversely to both the lateral direction and the sliding direction, and (ii) toward a surface of the one of the recesses for providing a biasing force to retard the slideable engagement of the cover and the base.

2. The armrest of claim 1, farther comprising at least two of the leaf springs on the at least one guide, each leaf spring being sized and shaped to provide frictional force to retard the slideable engagement of the cover and the base.

3. The armrest of claim 1, farther comprising a detent mechanism for delineating desirable relative positions of the cover and the base.

4. The armrest of claim 3, wherein the detent mechanism comprises at least one projection and at least one further recess, each disposed on one of the cover and the base such that the at least one projection and the at least one further recess may engage one another to achieve the relative positions of the cover and the base.

5. The armrest of claim 4, wherein the at least one projection and the at least one further recess are arranged at predetermined intervals along a direction in which the cover and the base slide relative to one another.

6. The armrest of claim 4, wherein the at least one projection and the at least one further recess are either directed upwardly from the base or downwardly from the cover.

7. The armrest of claim 4, wherein the at least one projection and the at least one further recess extend laterally in a direction in which the cover and the base slide relative to one another.

8. The armrest of claim 1, wherein the at least one guide and the grooves are formed from plastic.

9. The armrest of claim 1, further comprising a stop means for preventing the cover and the base from disconnecting from each other when a maximum relative position is reached.

10. The armrest of claim 9, wherein the stop means comprises a vertical wall on one of the cover and the base, said wall being operable to engage with an end of the other of the cover and the base when the maximum relative position is reached.

11. The armrest of claim 10, wherein the vertical wall includes one or more ribs that abut the end when the maximum relative position is reached.

12. The armrest of claim 1, wherein said armrest operates as a lid of a compartment of a vehicle console beside a seat.

13. A vehicle console, comprising:
a storage compartment;
a lid for covering the compartment, the lid having a cover and a base connected to one another by way of a guide-groove arrangement whereby the cover is slideable relative to the base in a sliding direction, the guide-groove arrangement comprising:
one of at least one guide, and at least first and second grooves located on the cover; and
the other of the at least one guide and the grooves located on the base, wherein:
the at least one guide and the grooves extend longitudinally in the sliding direction,
the first and second grooves are disposed laterally opposite to one another and each includes a recess, the respective recesses face one another in a lateral direction, transverse to the sliding direction,
the at least one guide extends laterally into at least one of the recesses, and the cover and the base are slideably engaged with one another by the at least one guide and the grooves in the sliding direction; and
at least one leaf spring integrally depending from the at least one guide and laterally extending into the one of the recesses such that the at least one leaf spring is biased: (i) transversely to both the lateral direction and the sliding direction, and (ii) toward a surface of the recess for providing a biasing force to retard the slideable engagement of the cover and the base.

14. The vehicle console of claim 13, wherein an end of the base is pivotally connected to the compartment by a hinge so as to open and close the compartment.

* * * * *